United States Patent [19]

Flaten

[11] Patent Number: 5,467,269

[45] Date of Patent: Nov. 14, 1995

[54] METHOD AND MEANS FOR TELEPHONICALLY CREDITING CUSTOMERS WITH REBATES AND REFUNDS

[75] Inventor: Lawrence M. Flaten, Carmel, Ind.

[73] Assignee: J. B. Laughrey, Inc., Indianapolis, Ind.

[21] Appl. No.: 251,012

[22] Filed: May 31, 1994

Related U.S. Application Data

[63] Continuation of Ser. No. 811,581, Dec. 20, 1991, abandoned.

[51] Int. Cl.⁶ .................................................. G06F 15/00
[52] U.S. Cl. ........................... 364/401; 364/408; 379/91; 379/93
[58] Field of Search ............................... 364/400, 401, 364/405; 379/67, 90, 91, 92, 93

[56] References Cited

U.S. PATENT DOCUMENTS

| | | | |
|---|---|---|---|
| 4,674,041 | 7/1987 | Lemon et al. | 364/401 |
| 4,723,212 | 2/1988 | Mindrum et al. | 364/401 |
| 4,817,129 | 3/1989 | Riskin | 379/88 |
| 4,876,592 | 10/1989 | Von Kohorn | 348/13 |
| 4,878,239 | 10/1989 | Solomon et al. | 379/67 |
| 4,882,675 | 11/1989 | Nichtberger et al. | 364/401 |
| 4,896,791 | 1/1990 | Smith | 221/7 |
| 4,908,761 | 3/1990 | Tai | 364/401 |
| 4,949,256 | 8/1990 | Humble | 364/401 |
| 4,985,913 | 1/1991 | Shalom et al. | 379/76 |
| 5,039,848 | 8/1991 | Stoken | 235/381 |
| 5,056,019 | 10/1991 | Schultz et al. | 364/405 |
| 5,057,915 | 10/1991 | Von Kohorn | 348/13 |
| 5,173,851 | 12/1992 | Off et al. | 364/401 |
| 5,176,224 | 1/1993 | Spector | 186/52 |
| 5,185,695 | 2/1993 | Pruchnicki | 364/401 |
| 5,192,854 | 3/1993 | Counts | 235/375 |
| 5,200,889 | 4/1993 | Mori | 364/401 |
| 5,208,445 | 5/1993 | Nahar et al. | 235/375 |
| 5,245,533 | 9/1993 | Marshall | 364/401 |
| 5,256,863 | 10/1993 | Ferguson et al. | 235/383 |

*Primary Examiner*—Gail O. Hayes
*Assistant Examiner*—Joseph Thomas
*Attorney, Agent, or Firm*—Baker & Daniels

[57] ABSTRACT

An apparatus and method provides for the crediting of accounts of a user for purchasing a given product. A manufacturer establishes an account with a service bureau who, in turn, sets up an access line such that the user can access the line to obtain a credit on his account. The account is typically a distinct account for each user associated with each user's individual access line. The service bureau can tabulate total credits for a given user during a given time period and then each user's account can be credited as appropriate.

18 Claims, 2 Drawing Sheets

METHOD AND MEANS FOR TELEPHONICALLY CREDITING CUSTOMERS WITH REBATES AND REFUNDS

This is a continuation of application Ser. No. 07/811,581, filed Dec. 20, 1991 now abandoned.

BACKGROUND OF THE INVENTION

1. Field of the Invention

The present invention generally relates to a system for crediting accounts of a user after purchasing a given product. The invention specifically relates to access lines wherein the user's account can be credited rather than charged.

2. The Prior Art

Telephone companies provide many services to both consumers and businesses including establishing specific lines for their individual needs. A toll-free line, frequently referred to as an "800-number" is a line set-up by businesses generally by which a caller makes a call to the business at no charge. The charge, on the contrary, is made to the business which has set-up the toll-free line.

A more recent development is a service line or predetermined charge line, commonly referred to as a "900-number." In this type of line, a service bureau arranges with a carrier, generally a telephone company, to establish an account in which the service bureau can provide a message when the "900-number" is called by a user. The user, in turn, can be charged by the telephone company the cost of the call at a set-rate established by the service bureau.

The most common type of line is the individual line in which each call placed on that line is charged a specified amount based on the time-of-day in which the call is made and the duration of the call. These lines, of course, are available in individual households, businesses or any other user in which such a line is desired.

A distinct area, but significant to the present invention, is coupon redemption or refunds by a user submitting a rebate certificate. Typically, a manufacturer, a wholesaler or a distributor can establish with a service bureau or a retailer the responsibility of administering coupons or rebates presented by an ultimate customer of the retail outlet. Generally, these coupons or rebates can be found in newspapers, mailed to the consumer or distributed by other established marketing techniques by the manufacturer and/or the service bureau. The user then takes the coupon to a retailer and the amount shown on the coupon is deducted from the cost of a product or credited to the amount of his total purchase. Or, using rebates, the user sends a portion of the packaging of the product to the service bureau, such as the Universal Product Code, and the service bureau refunds a designated portion or all of the cost of the product purchased by the user. The service bureau has an account set-up by the manufacturer or wholesaler or distributor for providing the refunds and administering the promotion.

SUMMARY OF THE INVENTION

The present invention provides a system in which an account of a user can be credited by telephonic communication.

In an embodiment, the system provided by this invention allows a user to access his account associated with a carrier and to provide a code supplied to the user from a retailer or source (it being understood that the designation "source" may include a manufacturer, a wholesaler or a distributor) such that a credit can be deducted from the user's account. The source or retailer is, in effect, supplying a coupon or rebate certificate in which the user redeems the coupon or rebate certificate by accessing the retailer's or source's individual service line established by a service bureau with the carrier. The carrier deducts credits to the user and charges a deposit account set-up at the service bureau. The service bureau, in turn, can charge and can refund any balance remaining in the account of the retailer or source. The service bureau can maintain the line installed by the carrier given instructions by the source or retailer, such as a pre-recorded message, questions for answering, etc. The user can access the line given the access line number on the coupon or rebate certificate and a unique code or codes found on each coupon or rebate certificate.

DESCRIPTION OF THE PREFERRED EMBODIMENTS

Figure 1:
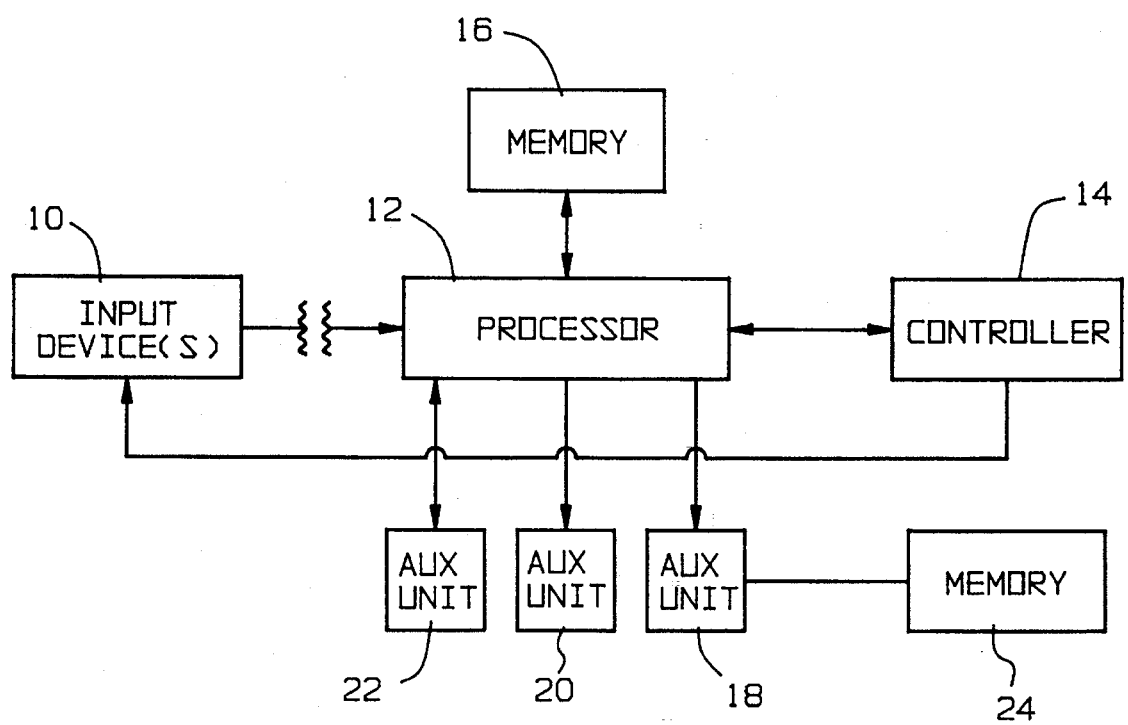
FIG. 1 is a block diagram of the system of the present invention.

A system is illustrated in FIG. 1 for implementing the present invention. An input device 10, such as a telephone or other remote input device, has means for interfacing with a processor 12 at a remote location. The processor 12 can be located, for example, at a telephone company or at a service bureau which has a communication access line set-up for it by the telephone company. The processor 12 has means for receiving data transmitted via the interface from the input device 10, typically a consumer's telephone, and also from an auxiliary unit 22. The auxiliary unit 22 has means for performing updating functions or other functions as necessary to implement changes in the system.

Figure 2:
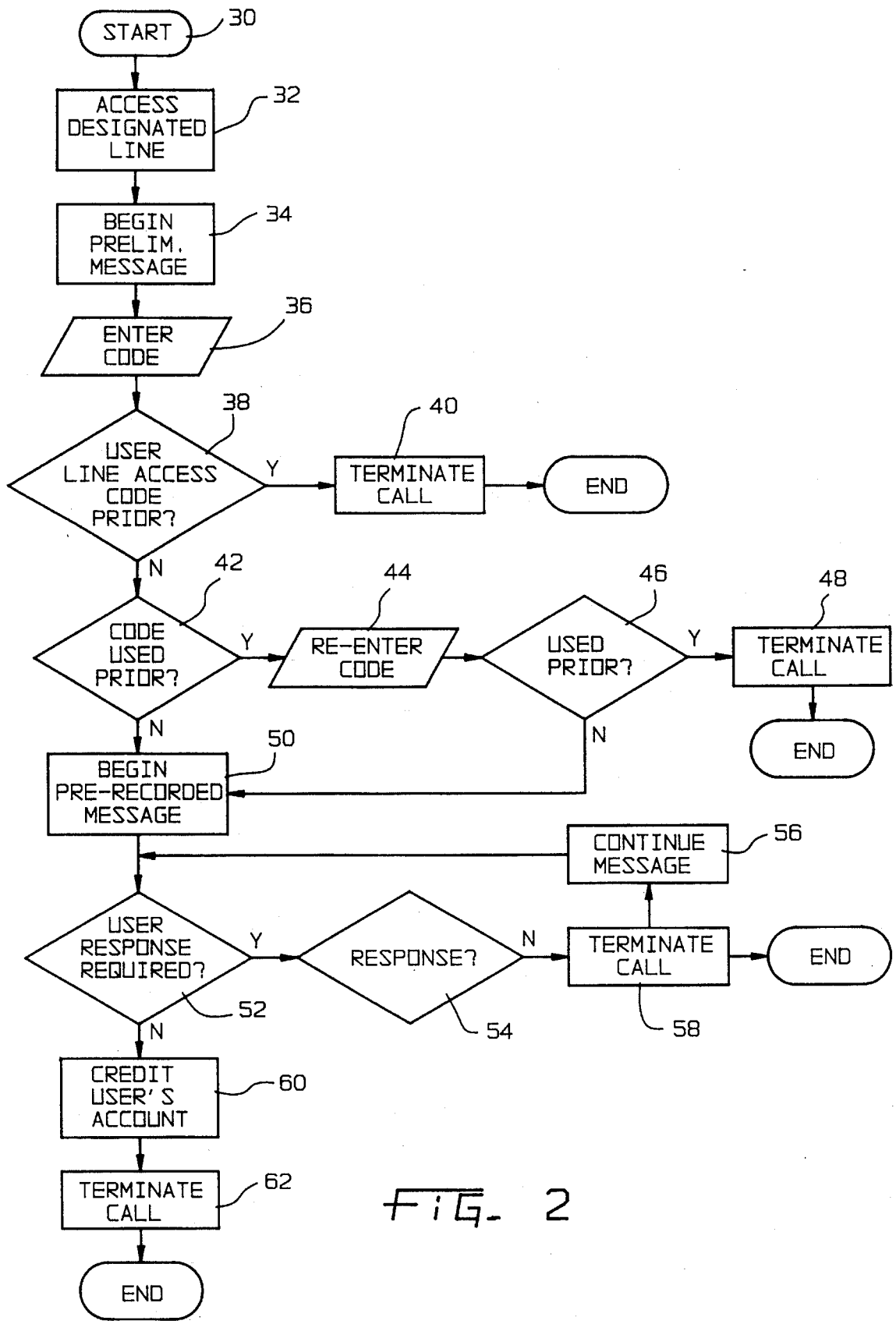
FIG. 2 is a flow chart of the system of the present invention.

The processor 12 can capture the data transmitted by the input device 10. The processor 12 then can perform a variety of functions as shown in FIG. 2.

To begin the process, a user accesses a designated line as at 32 and the processor 12 signals a controller 14 (shown in FIG. 1) to begin a preliminary message 34. The preliminary message may require the user to enter a code at 36. It is contemplated by the present invention that the code will be a predetermined, unique code placed on a coupon or rebate certificate in order for the consumer or the user to enter into the redemption procedure of this invention and to continue this procedure and ultimately obtain his or her rebate. In addition, multiple codes can be listed as a part of the certificate or coupon so as to designate a product code, store code, manufacturer code, retailer code, etc, thereby to supply valuable marketing and routing information to the administrators of the system.

The processor 12 then can determine whether the user has previously accessed this code from his designated line at 38. If so, the processor 12 can signal the controller 14 to play back a message that this line, i.e. the user's access line, has previously redeemed a predetermined number of certificates from this access line a predetermined number of times.

The processor 12 then can check at 42 to see if the code itself has been used prior. Since each code can be unique, it may only be used once or a predetermined number of times as determined by the manufacturer or retailer. If the code has been used prior, the processor 12 can signal the controller 14 to respond with a message to re-enter the code at 44. The processor again can determine if the code has been used before at 46. If so, the call can be terminated at 48. If not, the processor 12 can signal the controller 14 to begin a pre-recorded message at 50 as determined by a manufacturer or retailer.

The pre-recorded message typically may thank the user for calling, may tell the user what he must do to receive his credit, and then may provide a message regarding its product. In addition, questions can be asked of the user which can require a response by the user via the input device 10.

If a user response is required at 52, the processor 12 can signal the controller 14 to wait for a response at 54. If a response is not made by the user, line access can then be terminated at 58. Once a response is received, the processor 12 can signal the controller 14 to continue the message at 56. If no additional user responses are required, the process of receiving the credit is now over. The user or consumer can now have his own personal account credited at 60, and the line access can then be terminated.

The credits can then be typically stored in the processor 12 in a memory device 16, typically an EPROM. If a service bureau is conducting this service of coupon redemption or rebate certificate redemption, then the data stored in the memory 16 can be downloaded to the telephone company at periodic intervals, such as once per month, so that the account of the user can then be credited.

The processor 12 is also selectively interconnected with a plurality of auxiliary units identified at 18, 20 and 22. Typically, a display device 18 can be used to monitor activity or provide a display or print-out, such as the number of times a given line has been accessed, for example. The display device 18 can typically have its own memory unit 24 for storing data which has been displayed.

Additional auxiliary units 20, 22 can be used to tabulate or store data from the processor 12 for each individual service bureau, company, manufacturer or retailer for which the service is being provided. Additionally, an input device, such as a keyboard, can be used to supplement the data being received at the processor 12, as previously discussed.

Although various minor changes and modifications might be proposed by those skilled in the art, it will be understood that I wish to include within the claims of the patent warranted hereon all such changes and modifications as reasonably come within my contribution to the art.

I claim as my invention:

1. A system for crediting a rebate to a designated account of a user of the system, comprising:

a rebate certificate, said certificate having at least one predetermined unique code thereon;

input means for receiving from the user the predetermined unique code taken from the rebate certificate, said input means being capable of generating a signal comprising data corresponding to said predetermined code;

a processor linkable to said input means for receiving said signal, said processor being capable of reading said signal, said processor including means for identifying redeemable rebate certificates, and determining whether the rebate certificate having said predetermined unique code is redeemable;

means for linking the input device and the processor so that said signal may be transmitted therebetween; and means operatively associated with said processor for crediting the rebate to the designated account.

2. The system of claim 1, wherein said input device comprises a telephone capable of producing the signal, and said designated account comprises an account associated with use of said telephone, and wherein said processor further comprises means for determining whether the designated account is eligible for the rebate credit.

3. The system of claim 1, wherein said linking means comprises a telephone line.

4. The system of claim 1, wherein said means for identifying redeemable rebate certificates comprises a register of redeemable coupons, said system further comprising means for updating said register.

5. The system of claim 1, further comprising means responsive to said processor for controlling a predetermined communication with said user.

6. The system of claim 5, wherein said input means further comprises means for permitting response to predetermined inquiries of said predetermined communication.

7. The system of claim 1, further comprising means for terminating said link between the input device and the processor and thereby denying the rebate credit if said data processed by said processor that the rebate certificate having said predetermined code is not redeemable.

8. The system of claim 1, further comprising means for terminating said link between the input device and the processor and thereby denying the rebate credit if said data processed by said processor indicates that the designated account is not eligible for the rebate credit.

9. The system of claim 1, wherein said processor further comprises means for determining if said predetermined code has been used prior to its current use.

10. The system of claim 1, wherein said processor further comprises means for determining if said designated account has previously been credited with the rebate associated with the rebate certificate.

11. The system of claim 1, wherein said processor further comprises means for determining if said designated account has previously been credited with a rebate associated with a rebate certificate having a different predetermined unique code thereon.

12. The system of claim 1, further comprising means for storing a plurality of rebate credits wherein a total credit can be accumulated over a predetermined period of time.

13. The system of claim 1, further comprising means for inputting auxiliary data to said processor, said auxiliary data comprising at least one of updated identification data for redeemable rebate certificates and an alteration of features of said system.

14. The system of claim 1, wherein said processor further comprises a memory device for storing eligible rebate credits, and means for downloading data from said memory device for credit to said designated account.

15. A system for telephonically processing a rebate certificate and crediting a rebate associated therewith to a designated telephone account selected by a user of the system, the rebate certificate having at least one predetermined unique code thereon, comprising:

an input device for inputting the predetermined code from the rebate certificate, the input device comprising a telephone wherein the designated account is linked to usage of said telephone, said telephone being capable of producing a machine readable signal comprising data corresponding to said inputted predetermined code and said designated account, and being capable of transmitting said signal;

a processor remote from said input device, said processor being capable of receiving the signal from said input device and processing said data to determine (1)

whether the rebate certificate is redeemable, (2) the identity of the designated account, and (3) whether the designated account associated with the input means is eligible for the rebate;

means for telephonically linking the input device and the processor so that said signal may be transmitted therebetween; and means for crediting the rebate associated with a redeemable rebate certificate to the eligible designated account.

16. The system of claim 15, wherein said telephonic linking means comprises a telephone line connection.

17. The system of claim 15, wherein said processor further includes a memory device for storing eligible rebate credits, and including means for downloading data from said memory device after a predetermined period of time for credit to said designated account.

18. The system of claim 15, wherein said designated account is administered by a telephone company or a designee thereof; and wherein said means for crediting further comprises linking means between said processor and said telephone company or designee, and means for transmitting data corresponding to a rebate credit for said designated account to said telephone company or designee via said linking means.

* * * * *

UNITED STATES PATENT AND TRADEMARK OFFICE
CERTIFICATE OF CORRECTION

PATENT NO. : 5,467,269
DATED : November 14, 1995
INVENTOR(S) : Lawrence M. Flaten It is certified that error appears in the above-indentified patent and that said Letters Patent is hereby corrected as shown below:

Claim 1, column 3, line 48, after "designated", insert -- telephone --.

Claim 1, column 3, line 49, before "a user", insert -- selected by --.

Claim 1, column 3, line 63, after "input", delete "device", and insert -- means --.

Claim 1, column 3, line 66, after "designated", insert -- telephone --.

Claim 2, column 3, line 67, after "input", delete "device", and insert -- means --.

UNITED STATES PATENT AND TRADEMARK OFFICE
CERTIFICATE OF CORRECTION

PATENT NO. : 5,467,269
DATED : November 14, 1995
INVENTOR(S) : Lawrence M. Flaten It is certified that error appears in the above-indentified patent and that said Letters Patent is hereby corrected as shown below:

Claim 7, column 4, line 19, after "input", delete "device", and insert -- means --.

Claim 8, column 4, line 24, after "input", delete "device", and insert -- means --.

Signed and Sealed this

Fifth Day of March, 1996

*Attest:*

BRUCE LEHMAN

*Attesting Officer*     *Commissioner of Patents and Trademarks*